Patented Mar. 27, 1951

2,546,244

UNITED STATES PATENT OFFICE 2,546,244

INCREMENTAL ADDITION OF ALKALINE MATERIAL IN EMULSION POLYMERIZATION

Charles M. Tucker, Phillips, Tex., assignor to Phillips Petroleum Company, a corporation of Delaware No Drawing. Application May 19, 1947,
Serial No. 749,067

8 Claims. (Cl. 260—84.1)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith, to form long chain polymers of the type known as synthetic rubbers. In a still more specific aspect it relates to the polymerization of a butadiene-1,3 hydrocarbon and a monomer copolymerizable therewith in an aqueous dispersion. In the specific modification it relates to the use of alkaline reacting materials in ferricyanide-diazo thioether-mercaptan recipes to effect increased monomer conversion rates, these materials being added at intervals during the course of the polymerization.

In the production of rubber-like elastomers various polymerization recipes have been developed in order to provide polymers of superior synthetic rubber properties. Variations in operating techniques have also been introduced in order to effect further improvements in the properties of the product. Among the number of recipes employed certain advantages have been achieved through the use of ferricyanide-diazo thioether-mercaptan compositions as initiator-modifiers in emulsion polymerization systems. Recipes in which these additive compositions are employed have widespread application in view of the fact that numerous variations may be introduced, not only in the additive compositions themselves but in the emulsifying agents and in the monomers chosen. Through the use of these additive materials a means of effecting polymerization reactions over a rather wide temperature range is afforded. However when operating in this manner a very noticeable decrease in reaction rate is frequently observed, even at relatively low conversion levels. In some instances the polymerization rate is decreased to such an extent as to render the method impractical for large scale operation. While this effect is observed over a wide temperature range, it is particularly pronounced at temperatures lower than those most commonly employed in emulsion polymerization processes, which are now around 50° C.

I have now found a method whereby emulsion polymerization reactions using ferricyanide-diazo thioether-mercaptan recipes can be carried out over a wide temperature range in such a way that satisfactory reaction rates are realized throughout the entire period. The method comprises the addition of small quantities of alkaline-reacting materials to the polymerization system at intervals during the reaction. By operating in this manner the usual noticeable drop in reaction rate which occurs before the desired degree of conversion has been reached is overcome.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methyl chloroprene (2-chloro-3-methyl-1,3-butadiene), and the like; aryl olefins such as styrene, various alkyl styrenes, p-chloro styrene, p-methoxy styrene, alpha-methyl styrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

Another object of this invention is to produce an improved synthetic rubber.

A further object of this invention is to produce a synthetic rubber by polymerization of monomeric material in aqueous emulsion at temperatures lower than ordinarily used.

Still another object of this invention is to control the reaction rate in polymerizing unsaturated organic compounds in aqueous emulsion.

An additional object of our invention is to provide a method for effecting improved conversion rates of monomeric material in polymerization systems wherein ferricyanide-diazo thioether-mercaptan compositions are employed as initiator-modifiers.

A further object of this invention is to effect improved conversion rates in ferricyanide-diazo thioether-mercaptan recipes at low temperatures.

Other objects and advantages of this invention will become apparent, to one skilled in the art, from the accompanying disclosure and discussion.

The ferricyanide-diazo thioether-mercaptan compositions referred to in this application comprise a ferricyanide such as potassium ferricyanide, a diazo thioether of the water soluble or oil soluble type, and a mercaptan or blend of mercaptans.

The diazo thioethers employed in the initiator-modifier compositions have the general structural formula $R-N=N-S-R'$ wherein R is a member of the group consisting of aromatic and substituted aromatic radicals and R' is a member of the group consisting of aromatic, substituted aromatic, cycloalkyl, substituted cycloalkyl, aliphatic, and substituted aliphatic radicals. The diazo thioethers preferred for use as polymerization catalysts in accordance with the present invention are those in which both R and R' in the foregoing structural formula are aromatic or substituted aromatic groups. Examples of preferred compounds are substituted phenyl diazo thio-(naphthyl) ethers, phenyl diazo thio-(phenyl) ethers, naphthyl diazo thio-(phenyl) ethers, and naphthyl diazo thio-(naphthyl) ethers. Preferred substituent groups are the alkyl, alkoxy, aryloxy (e. g., phenoxy), carboxy, sulfo ($SO_3H$), halo, and nitro groups. Other substituents give diazo thio-ethers of varying degrees of usefulness. Among preferred compounds are those more fully described in an application of Reynolds and Cotton, Serial No. 641,866, filed January 17, 1946, now Patent No. 2,501,692, granted March 28, 1950, and are those represented by the formula

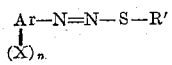

where Ar is an aryl group and X is a substituent selected from the group consisting of alkyl, alkoxy, aryl and aryloxy radicals; and R' is a member of the group consisting of aromatic, substituted aromatic, cycloalkyl, substituted cycloalkyl, aliphatic, and substituted aliphatic radicals. Specific examples are the following: p-methoxy phenyl diazo thio-(2-naphthyl) ether, dimethyl phenyl diazo thio-(2-naphthyl) ether, dimethyl phenyl diazo thio-(p-methoxy phenyl) ether, p-methoxy phenyl diazo thio-(o-carboxy phenyl) ether, p-sulfo phenyl diazo thio-(2-naphthyl) ether, p-sulfo phenyl diazo thio-(p-tolyl) ether, 2-naphthyl diazo thio-(carboxy phenyl) ether, and the like, together with the ammonium and alkali metal salts of such compounds. Some of the more important compounds may be conveniently represented by the formula

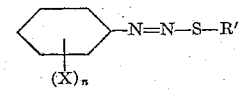

where X is a substituent selected from the group consisting of alkoxy and aryloxy radicals, $n$ is an integer from one to four, and R' is a member of the group consisting of aromatic, substituted aromatic, cycloalkyl, substituted cycloalkyl, aliphatic, and substituted aliphatic radicals.

The total amount of diazo thioether used in the present process will generally range from about 0.05 to about 1.0 part per 100 parts monomers with about 0.10 to about 0.50 part being most frequently preferred. The amount is governed by the operating temperature and the quantities of the other catalytic materials present.

The ferricyanides which are applicable are those of the alkali metals, including ammonium. However, potassium ferricyanide is most generally preferred. The amount of ferricyanide employed may vary from about 0.03 to about 1 part per 100 parts monomers but the preferred amount usually ranges from about 0.05 to about 0.5 part. The amount of this and other catalyst constituents in any particular case will, of course, be somewhat dependent upon the amounts of other constituents, and optimum amounts can be readily determined by one skilled in the art.

The mercaptans which may be employed comprise those of primary, secondary, and tertiary configuration containing from four to twenty carbon atoms per molecule with those containing from about six to about sixteen carbon atoms per molecule being most generally preferred. While tertiary mercaptans are most widely used and in many cases are mose desirable, primary and secondary mercaptans are sometimes advantageous. It is also frequently preferred to employ blends of mercaptans such as, for example, blends of tertiary $C_{12}$, $C_{14}$, and $C_{16}$ mercaptans.

The quantity of mercaptans used will vary depending upon the molecular weight and purity of the material as well as upon the results desired. For example, when tertiary $C_{12}$ mercaptan is employed, the amount generally varies within the range of about 0.05 to about 1.40 parts per 100 parts of monomer charged, with the narrower range of about 0.10 to about 0.45 part being most frequently preferred.

Emulsion polymerization recipes employing ferricyanide-diazo thioether-mercaptan compositions as initiator-modifiers are advantageous in many respects. They are particularly adaptable to low temperature operations since the reaction rate is sufficiently rapid to warrant their use. Another advantage is that rubber made by these recipes is of superior quality especially from the viewpoint of easy processibility. However when conventional polymerization techniques are employed the reaction proceeds in the expected manner for a time and then a pronounced drop in the rate is observed. This drop in reaction rate, or tendency to die out, occurs at various levels depending upon the temperature employed and it is frequently observed at relatively low conversions. The addition of alkaline-reacting substances at intervals during the reaction period overcomes this difficulty.

According to the process of this invention a small quantity of alkaline-reacting material is added at intervals to the polymerization system as the reaction progresses. The intervals at which this additive material is introduced depend upon the operating temperature, the kind and amount of basic material added, the emulsifying agent employed, and the like. In general, when higher temperatures are employed and the reaction rate is faster, the addition of basic material will generally be made in a shorter time than when the reaction is carried out at lower temperatures. For example, when the polymerization is effected at about 20° C. or higher, addition is frequently made at about three- and about six-hour reaction periods while at a temperature of about 5° C. intervals of about four and about eight hours, or even about five and about ten hours, are used. Additions at three, six and nine hours are usually considered more desirable. The addition of portions of alkaline-reacting material is adjusted to produce optimum results in the system at hand and, therefore, the number of additions as well as the time of introduction of the material will be different for different reaction systems, and can be readily established, by one skilled in the art, for any particular reaction system.

The alkaline-reacting substances employed herein comprise compounds selected from the group consisting of alkali metal hydroxides, phosphates, carbonates, and pyrophosphates. On account of their availability and relatively low cost, sodium compounds are more frequently employed than compounds of the other alkali metals. The amount of material added is always small and depends upon the particular compound used. In the case of sodium hydroxide, for example, when the addition is made at two intervals during the reaction, an amount ranging from about 0.01 to about 0.10 part per 100 parts of monomers is usually employed for each addition.

In order to illustrate the process of my invention, a polymerization recipe wherein a rosin soap is employed as the emulsifying agent is presented. The following ingredients are charged to any conventional type reactor:

| | Parts by weight |
|---|---|
| Butadiene | 75 |
| Styrene | 25 |
| Rosin soap (adjusted to pH 10.0) | 5.0 |
| Tertiary mercaptan blend [1] | 0.45 |
| Diazo thioether [2] | 0.2 |
| Potassium ferricyanide | 0.3 |
| Sodium sulfate | 0.3 |
| Water | 180 |

[1] A blend of mixed tertiary mercaptans comprising $C_{12}$, $C_{14}$, and $C_{16}$ mercaptans in a ratio of 3:1:1 parts by weight.
[2] The diazo thioether most frequently used is 2-(p-methoxybenzene diazo mercapto)-naphthalene.

The emulsified reactants are agitated by conventional means at the desired reaction temperature. A small amount of alkaline-reacting material is introduced in aqueous solution at intervals, say at the end of a three-hour period and again after six hours, during the course of the reaction. When the desired conversion has been reached the reaction is shortstopped and the rubber recovered from the resulting latex by any of the commonly used procedures.

In general, the preferred pH range for carrying out polymerization reactions according to the method of this invention will usually lie between about 9.5 and about 11.5. In cases where the pH of the emulsifying agent is considered too low, it can be readily adjusted by the addition of a basic material such as sodium hydroxide prior to carrying out the polymerization reaction.

When operating according to the method of this invention temperatures may range from about −30 to about 70° C. with temperatures from about −20 to about +50° C. usually preferred. Obviously when polymerizations are carried out in aqueous emulsion in the absence of freezing point depressants, temperatures below the freezing point of water cannot be employed. The use of various additive agents, however, makes a process of the type disclosed herein applicable at lower temperatures, and, in fact, this is one of the distinct advantages of the present invention. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. When higher temperatures are employed, say up to about 50° C., some variations are usually introduced in the ferricyanide-diazo thioether-mercaptan compositions. For example, the amount of ferricyanide is generally decreased as the temperature is increased and may even be as low as 0.1 part.

The method of this invention is particularly applicable to rosin soap systems although other emulsifying agents may be used is desired. Rosin soaps do not have the tendency to gel at low temperatures as do the usual fatty acid soaps and, therefore, certain advantages are to be gained through their use.

The following examples are offered to set forth more clearly the advantages of the invention, but they are not to be construed as unduly limiting to the scope of the invention.

Example I

Three polymerization runs were carried out using the following recipe:

| | Parts by weight |
|---|---|
| Butadiene | 75 |
| Styrene | 25 |
| Rosin soap | 5.0 |
| Tertiary mercaptan blend [1] | 0.5 |
| 2-(p-methoxybenzene diazo mercapto)-naphthalene | 0.2 |
| Potassium ferricyanide | 0.3 |
| Sodium sulfate | 0.3 |
| Water | 180 |

[1] A blend of mixed tertiary mercaptans comprising $C_{12}$, $C_{14}$, and $C_{16}$ mercaptans in a ratio of 3:1:1 parts by weight.

In the first run the pH of the rosin soap was adjusted to 9.6 by addition of sodium hydroxide prior to starting the polymerization while in the second run the pH was adjusted to 10.3. In the third run the pH at the start of the reaction was 10.3 and 0.022 part sodium hydroxide was added to the polymerization mixture at the end of three and six hours, respectively. All runs were carried out at a temperature of 20° C. The conversions at the end of 1, 2, 4, and 6-hour periods are shown in the following table, as well as the final conversion and the time required to achieve these results:

| Run | Percent Conversion at Indicated Time (Hours) | | | | Final Conversion | |
|---|---|---|---|---|---|---|
| | 1 | 2 | 4 | 6 | Percent | Time, Hours |
| 1 | 26.9 | 39.0 | 44.5 | | 54.4 | 14.2 |
| 2 | 24.5 | 36.3 | 43.1 | 45.3 | 45.9 | 7.8 |
| 3 | 27.3 | 40.2 | 59.9 | 69.9 | 72.0 | 6.7 |

Example II

A butadiene-styrene copolymerization was carried out at 5° C. using the recipe of Example I except for use of 0.4 part, in place of 0.2 part, diazo thioether. The pH of the system was adjusted to 10.3 prior to starting the reaction. Sodium hydroxide (0.022 part) was added at both four- and eight-hour intervals during the polymerization. At the end of 12 hours 58 per cent conversion had been reached. A similar run in which no extra caustic alkali was added progressed to only 37 per cent conversion in twelve hours.

Example III

Using the recipe of Example II and a temperature of 5° C., a butadiene-styrene copolymer was prepared. The pH of the system was adjusted to 10.3 prior to starting the reaction. Sodium phosphate ($Na_3PO_4 \cdot 12H_2O$, 0.5 part) was added at intervals of five and ten hours during the polymerization. A conversion of 60 per cent was obtained in 12 hours in contrast to 38 per cent in a similar experiment in which no sodium phosphate was added.

Example IV

The recipe employed in Example I was used except that 0.4 part 2-(p-methoxy-benzene diazo mercapto)-naphthalene was added instead of 0.2 part and the amount of tertiary mercaptan blend was 0.42 part. Sodium hydroxide (0.022 part) was added at intervals of 3, 6, and 9 hours during the polymerization and the temperature was maintained at 5° C. The data on two runs are tabulated below:

| Soap, pH | Per Cent Conversion at Hour | | | | | Final | | |
|---|---|---|---|---|---|---|---|---|
| | 1 | 2 | 3 | 6 | 9 | Time, hrs. | Per Cent Conversion | Mooney Value |
| 9.9 | 6.1 | 15.7 | 22.4 | 33.6 | 47.5 | 11.5 | 60.0 | 45 |
| 10.0 | 7.3 | 16.6 | 20.9 | 33.6 | 49.3 | 12.0 | 59.4 | 46 |

A similar run in which no extra caustic was added gave a conversion of only 37 per cent in 12 hours.

Example V

The following data show the improvement in the degree of conversion of butadiene-styrene polymers when NaOH is added in two steps over that obtained when a comparable amount of NaOH is added at the start. The following recipe was used:

| | |
|---|---|
| Butadiene, distilled, 99.0%__parts by weight | 75 |
| Styrene, caustic washed, 99.8%_____do | 25 |
| Water, zeolite treated_____do | 180 |
| Dresinate 731 (a rosin soap)_____do | 5 |
| MDN (2-(p-methoxybenzene diazo mercapto)-naphthalene)___parts by weight | 0.2 |
| Mixed tertiary mercaptans, Serial 4 [1]_do | 0.5 |
| Potassium ferricyanide, C. P_____do | 0.3 |
| Sodium sulfate, anhydrous, C. P_____do | 0.3 |
| Sodium hydroxide | Variable |
| Agitation, R. P. M | 300 |
| Temperature _____°C | 20 |

[1] A blend of tertiary $C_{12}$, $C_{14}$, and $C_{16}$ mercaptans in a ratio of 3:1:1 parts by weight.

Materials were charged in the same order as in the Mutual GR-S recipe.

In run A 0.092 part of NaOH was added at the start to give a pH of 10.3 and then 0.011 part added at the end of three hours. In run B 0.102 part of NaOH was added at the start to provide a pH of 10.8 and no further additions were made. The observed degrees of conversion at specified times are shown below:

| Run | Per Cent Conversion at Hours | | | | | |
|---|---|---|---|---|---|---|
| | 1 | 2 | 3 | 4 | 5 | 6 |
| A | 25.9 | 33.6 | 43.2 | 53.3 | 58.2 | 62.6 |
| B | 27.0 | 34.7 | | 42.9 | | 47.6 |

Further, it has been observed that the pH of the system gradually decreases as the reaction proceeds. Since it is known that a very high pH is detrimental to the product, an important advantage of the invention is that the increment addition of caustic permits the advantages of a high permissible pH to be obtained over the whole period of the reaction without the harmful effects of a peak in the pH at the start.

As will be evident to those skilled in the art, various modifications of this invention can be made, or followed, in the light of the foregoing disclosure and discussion, without departing from the spirit or scope of the disclosure or from the scope of the claims.

I claim:

1. A process for the production of synthetic rubber, which comprises polymerizing in an aqueous emulsion a monomeric material comprising a major amount of a polymerizable 1,3-diolefin by initially establishing a pH for said emulsion between 9.5 and 11.5, promoting said polymerization with a composition comprising 0.03 to 1 part of a water-soluble ferricyanide of a monovalent cation, 0.05 to 1 part of a diazo thioether having the formula R—N=N—S—R′ wherein R is an aromatic radical and R′ is a member of the group consisting of aromatic, cycloalkyl and aliphatic radicals, 0.03 to 1 part of a water-soluble ferricyanide, and 0.05 to 1.4 parts of a mercaptan having six to 20 carbon atoms per molecule, all being parts by weight per 100 parts of said monomeric material, and during the course of the reaction adding to the reacting mixture a plurality of increments of an alkali metal hydroxide in an amount for each increment between 0.01 and 0.1 part per 100 parts of monomeric material.

2. The process of claim 1 in which said monomeric material comprises a major amount of 1,3-butadiene and a minor amount of styrene.

3. A process for the production of a polymeric material of high molecular weight, which comprises polymerizing in an aqueous emulsion a monomeric material comprising an unsaturated organic compound having a CH$_2$=C< group by initially establishing a pH for said emulsion between 9.5 and 11.5, promoting said polymerization with a composition comprising 0.03 to 1 part of a water-soluble ferricyanide, 0.05 to 1 part of a diazo thioether having the formula $$R—N=N—S—R'$$

wherein R is an aromatic radical and R′ is a member of the group consisting of aromatic, cycloalkyl and aliphatic radicals, 0.03 to 1 part of a water-soluble ferricyanide, and 0.05 to 1.4 parts of a mercaptan having four to twenty carbon atoms per molecule, all being parts by weight per 100 parts of said monomeric material, and during the course of the reaction adding a plurality of increments of an alkaline-reacting material selected from the group consisting of alkali metal hydroxides, phosphates, carbonates and pyrophosphates in an amount for each increment between 0.01 and 0.1 part per 100 parts of monomeric material.

4. In a process for the production of synthetic rubber by copolymerization in aqueous emulsion of a monomeric material comprising a major portion of 1,3-butadiene and a minor portion of styrene, the improvement which comprises admixing in a reaction zone said monomeric material and an aqueous medium with the ratio of aqueous medium to monomeric material between 1.5:1 and 2.75:1 by weight and with the pH of the mixture initially between 9.5 and 11.5, also admixing in said reaction zone with said materials a rosin soap as emulsifying agent, 0.1 to 0.5 part of 2-(p-methoxybenzene diazo mercapto)-naphthalene, 0.05 to 0.5 part of an alkali metal ferricyanide, and 0.05 to 1.4 parts of an alkyl mercaptan having twelve to sixteen inclusive carbon atoms per molecule, intimately admixing the resulting mixture at a temperature between −30 and 70° C. for a period of one to fourteen hours, and a plurality of times during said period adding to said mixture an alkali metal hydroxide in an amount between 0.01 and 0.1 part, all parts being parts by weight per 100 parts of said monomeric material, and subsequently withdrawing from said reaction zone a resulting synthetic rubber latex.

5. In a process for the production of synthetic rubber by copolymerization in aqueous emulsion of a monomeric material comprising a major portion of 1,3-butadiene and a minor portion of styrene, the improvement which comprises admixing in a reaction zone said monomeric material and an aqueous medium with the ratio of aqueous medium to monomeric material between 1.5:1 and 2.75:1 by weight and with the pH of the mixture initially between 9.5 and 11.5, also admixing in said reaction zone with said materials an emulsifying agent, 0.05 to 0.5 part of a methoxybenzene diazo mercapto-naphthalene, 0.03 to 1 part of an alkali metal ferricyanide, and 0.05 to 1.4 parts of an alkyl mercaptan having six to sixteen inclusive carbon atoms per molecule, intimately admixing the resulting mixture, and a plurality of times during said admixing adding to said mixture an alkali metal hydroxide in an amount between 0.01 and 0.1 part, all parts being parts by weight per 100 parts of said monomeric material, and subsequently withdrawing from said reaction zone a resulting synthetic rubber latex.

6. In the polymerization of a monomeric material comprising a major amount of 1,3-butadiene and a minor amount of styrene in an aqueous emulsion to produce synthetic rubber, the improvement which comprises admixing in a reaction zone the said monomeric material and an aqueous medium having an initial pH between 9.5 and 11.5, polymerizing the said monomeric material in the presence of 0.05 to 1 part of diazo thioether having the formula R—N=N—S—R′ wherein R is an aromatic radical and R′ is a member of the group consisting of aromatic, cycloalkyl and aliphatic radicals, 0.03 to 1 part of a water-soluble ferricyanide and 0.05 to 1.4 parts of an alkyl mercaptan having six to twenty carbon atoms per molecule, and during the course of reaction adding to the reacting mixture a plurality of increments of sodium hydroxide in an amount for each increment between 0.01 and 0.1 part, all parts being parts by weight per 100 parts of monomeric material.

7. In the polymerization of monomeric material comprising an unsaturated organic compound having a CH$_2$=C= group in an aqueous emulsion to produce polymeric material of high molecular weight, the improvement which comprises admixing in a reaction zone the said monomeric material and an aqueous medium having an initial pH between 9.5 and 11.5, polymerizing the said monomeric material in the presence of 0.05 to 1 part of diazo thioether having the formula R—N=N—S—R′ wherein R is an aromatic radical and R′ is a member of the group consisting of aromatic, cycloalkyl and aliphatic radicals, 0.03 to 1 part of a water-soluble ferricyanide and 0.05 to 1.4 parts of an alkyl mercaptan having four to twenty carbon atoms per molecule, and during the course of reaction adding to the reacting mixture a plurality of increments of an alkali metal hydroxide in an amount for each increment between 0.01 and 0.1 part, all parts being parts by weight per 100 parts of monomeric material.

8. The process of claim 7 in which said monomeric material comprises a major amount of a polymerizable 1,3-diolefin.

CHARLES M. TUCKER.

REFERENCES CITED

The following references are of record in the file of this patent:

UNITED STATES PATENTS

| Number | Name | Date |
|---|---|---|
| 2,259,180 | Schoenfeld et al. | Oct. 14, 1941 |
| 2,281,613 | Wollthan et al. | May 5, 1942 |
| 2,422,392 | Brubaker et al. | June 17, 1947 |
| 2,425,840 | Schulze et al. | Aug. 19, 1947 |

OTHER REFERENCES

H. Barron: "Modern Synthetic Rubbers," 2nd edition, pages 156–157. Published by Van Nostrand, N. Y. (1944).